Patented Aug. 27, 1946

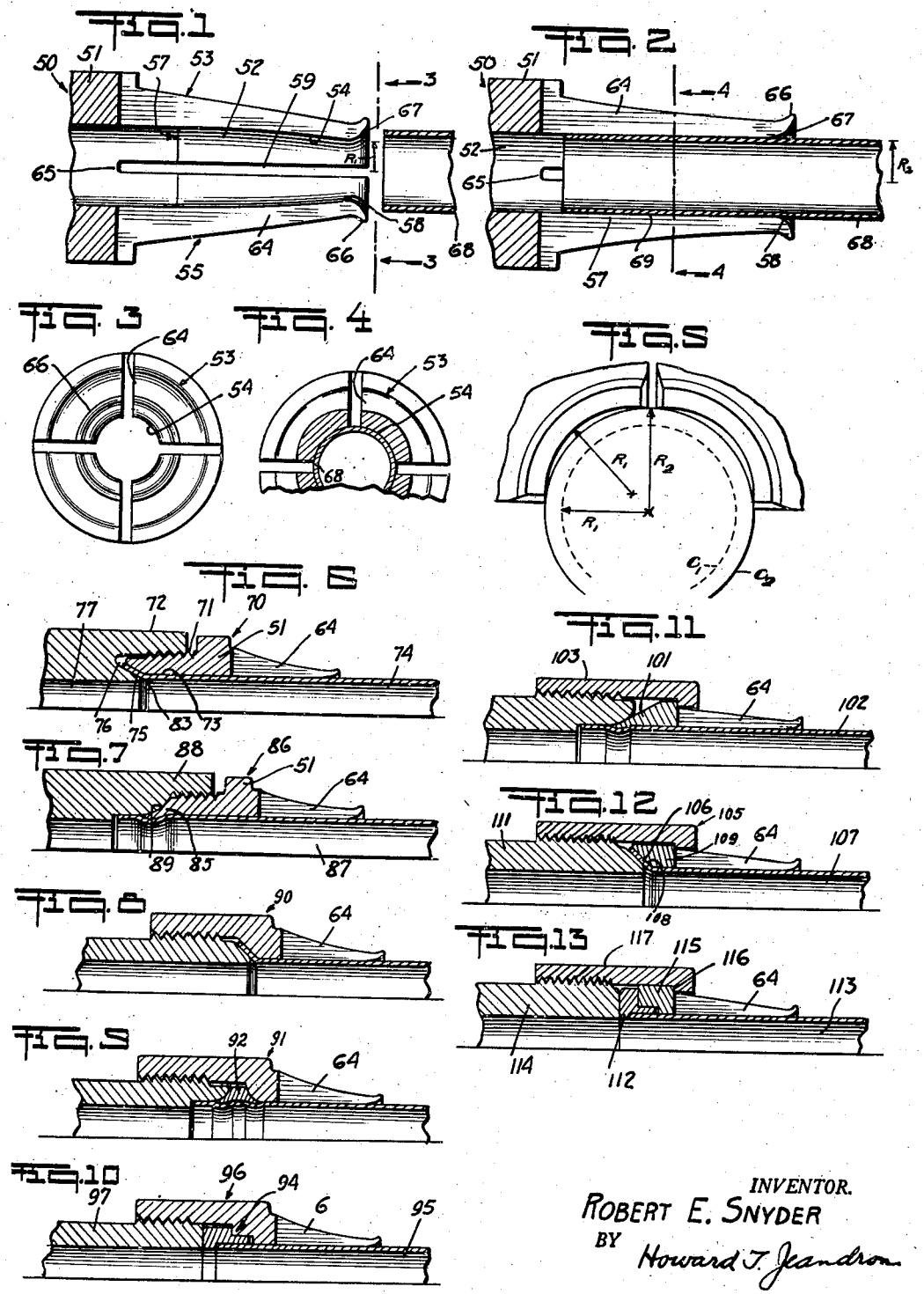

2,406,478

UNITED STATES PATENT OFFICE 2,406,478

DUCTILE TUBING CONNECTOR

Robert E. Snyder, Pasadena, Calif.

Application March 15, 1943, Serial No. 479,247

3 Claims. (Cl. 285—90)

This invention relates to pipe joints or couplings, and more particularly to couplings of the type used to interconnect flexible or yielding pipe through the expedient of a thimble or ferrule freely revoluble upon one of the tubes to be interconnected and adapted to be engaged upon the other by means of screw threads formed on the thimble and thus join the two tubes in a leakproof connection having sufficient strength to meet commercial requirements.

In particular, the invention is concerned with the provision of auxiliary resilient means in conjunction with a tubing connector for yieldingly supporting the tubing adjacent its point of entry into the connector. The auxiliary means forms a contracted throat of smaller size than the tubing which may be expanded to fit the size of the tubing through spreading of the parts of the auxiliary structure. The present application is a continuation-in-part of my earlier pending application, Serial No. 326,699, filed March 29, 1940, and in addition to embodying the features of such prior application, the present invention incorporates additional features relating to the cross-sectional contour of the interior of the auxiliary structure in its contracted and expanded positions in relation to the contour of the tubing.

It is readily apparent that when couplings of the type indicated are used to interconnect sections of tubing, the cross-sectional area of the couplings will be relatively great compared with that of the tubing they serve to interconnect. Furthermore, the connectors being of greater diameter than the tubing on which they are mounted, they are materially stiffer than the tubing. As a result, whenever such a line of tubing is subjected to continued vibration of flexure, or both, very characteristic points of failure develop in the tubing. In general, these failures occur very close to the juncture of the tubing and the coupling; the exact point of failure depending upon the type of connector used, the type and physical uniformity of the tubing, the vibrational frequency and amplitude, the damping means used, the unsupported length of tube, and other variables. In the greater number of examples, the failure occurs less than one diameter of the enclosed tube away from the coupling or last point of support of the tubing by the coupling.

Scientifically, the explanation may be made in terms of stiffness. "Stiffness," according to one authority, is defined as "the resistance to deformation under stress," or "the restoring force per unit displacement," wherein the deformation is presumed not to exceed the elastic limit of the material under consideration (Eshbach). Thus in a train of directly connected members of differing individual stiffnesses, the "resistance to deformation" or the "restoring force per unit displacement" will vary from member to member. The general rule seems to hold that under vibrational or cyclical stresses, stress concentrations will be produced in the train at all junctures of members of differing stiffnesses.

In a tube subjected to repeated flexure, either cyclical or otherwise, each unit particle of the material of which the tube is composed, is subjected alternately to tension and compression stresses, this action being most pronounced near the outer surface of the tube. The particles are, therefore, alternately pulled apart and pressed toward each other, and, as such action continues, they become displaced with reference to each other within the structure of the material, and gradually produce a surface "waviness" on the tube. These waves usually appear on circumferential arcs about the tube, and continued flexure tends to deepen the wave troughs until fissures occur at the bottoms of the troughs, which fissures gradually increase in length and width, ultimately uniting with other fissures, and a circumferential plane of weakness begins to develop. The resultant decrease in stiffness of the tubing along this plane causes a corresponding increase in the stress concentration in the weak portion and further hastens the action. When the fissure finally works clear through the tube, the process of progressive failure is complete. Any local corrosion may itself be the cause of a fissure or may aid in deepening a fissure as the oxide products created in the fissure act as a wedge to deepen it still further under continued flexure.

As an example, when a brass coupling is attached to a ductile copper tube in accordance with conventional practice, a construction is presented wherein a length of tubing consists of portions immediately adjacent each other and of different cross sectional area and hence possessing different degrees of stiffness, the portion having the lesser cross sectional area usually being the more flexible of the two. It is well known, however, that whenever a member of such a character is subjected to repeated flexure, a concentration of stress will be imposed upon the portion of lesser stiffness, immediately adjacent the point of its last support by the stiffer of the two portions. This accounts for the well recognized fact that the point of most probable failure of a conventional ductile copper tube, such as those regularly employed as oil lines, fuel lines, and compressed air conductors in many different types of mechanical installations, is in the tubing portion of such a line immediately adjacent any of the coupling thimbles.

An object of the present invention, therefore, is the provision of a novel type of coupling means for ductile tubing in which means are provided for avoiding concentration of stress in the more flexible of the two members which otherwise would be present when such a conductor is subjected to repeat flexure.

A more detailed object in this connection is to avoid the concentration of stress referred to by providing means for distributing stress which inevitably occurs when flexure of the tubing occurs. Inasmuch as it is out of the question to prevent the development of such stress, my present invention seeks to make the stress innocuous insofar as damage to the tubing is concerned; and this can best be accomplished by effecting the distribution of the stress over a material length of the tubing, and thus avoid the concentration of stress at a single point which heretofore has been the direct cause of failure in ductile copper tubing subject to repeated flexure.

A further object of the present invention is to assure the distribution of stress referred to by means of a yielding resilient support for the more flexible of the two portions of the conductor, preferably carried by the stiffer of the two and extending therefrom in continuous contact with the more flexible member in such a manner as to attain the results desired. Other manners of approaching the problem and providing the distribution of stress by means of different types of support for the less stiff member, form the subject matter of my United States Letters Patent No. 2,271,502, issued January 27, 1942, and No. 2,313,780, issued March 16, 1943.

Another object of my invention is to provide means resiliently supporting the more flexible of the two portions of the conductor, which means are carried by the stiffer member and engage the more flexible member in a sliding engagement, thereby enhancing the degree of flexibility of the assembled unit.

Another object of my invention is the provision of stress-distributing means for use in conjunction with the coupling for ductile metal tubing in the manner indicated, which interferes in no manner whatsoever with the efficiency of the coupling member as such, does not add materially to its cost of manufacture, and does not complicate or make more difficult the installation and/or servicing of the coupling member.

A further object is the provision of means for avoiding concentration of stress in a ductile metal tubing adjacent the couplings used in connection with that tubing, which does not detract materially from the flexibility of the tubing considered as a whole.

Yet another object of my invention is the provision of means for distributing stress over a material length of tubing adjacent the coupling used in connection with that tubing, which distributing means is constructed entirely of fireproof and heat-resistant material, preferably of the same material as that of which the coupling member is constructed, and adapted to lend itself economically to large-scale production upon a quantity basis by automatic machinery.

In addition to the foregoing general objects it is a further particular object of my invention to provide resilient means adapted to make surface-to-surface contact with the tubing adjacent the coupling throughout substantially the entire circumference of the tubing, and preferably also throughout an appreciable distance lengthwise of the tubing. The resilient means will have a normal contracted position in which it forms a throat for at least part of its length of lesser size than the tubing, and from such position the structure can be expanded to conform to the size of the tubing. The throat will have a different contour in its contracted and expanded positions, and in order that the structure may make surface-to-surface contact circumferentially with the tubing the contour of the throat is determined according to the expanded position of the structure.

The invention possesses other objects and features of advantage, some of which, with the foregoing, will be set forth in the following description of the preferred embodiments of my invention which are illustrated in the drawing accompanying and forming part of the specification. It is to be understood that I do not limit myself to the showing made by the said drawing and description, as I may adopt variations of the preferred embodiments within the scope of my invention as set forth in the claims.

Referring to the drawing:

Figure 1 is a longitudinal, medial sectional view of a portion of a coupling member having stress-distributing means embodying the principles of the present invention cooperatively disposed thereupon. A portion of the tube upon which the coupling member is intended to be positioned is shown in position to be thrust thereinto; and the stress-distributing elements are shown in the positions assumed thereby before engagement upon the tube.

Figure 2 is a view similar to Fig. 1, but showing the parts in the respective positions assumed thereby when the tubing and coupling members are disposed in assembled, operative relation.

Figure 3 is an end view of the coupling member taken on the line 3—3 of Figure 1, but on a somewhat smaller scale.

Figure 4 is a transverse section taken on the line 4—4 of Figure 2.

Figure 5 is an enlarged more or less diagrammatic explanatory view to make clear the reason for the circumferential curvature of the throat in the embodiments of the invention shown in Figures 1 to 4, and further illustrating the effect of employing a different curvature for the throat.

Figure 6 is a half longitudinal sectional view of a conventional "inverted flared" type of ductile tubing coupling showing my improved stress-distributing means formed integrally with the nut member of the coupling.

Figure 7 is a view similar to Figure 6, but showing the stress-distributing means formed upon the nut member of a coupling of the well-known "compression" type.

Figure 8 is a view similar to Figure 6, but showing the stress-distributing means formed as a portion of the nut member of the "standard flared tube" type of coupling.

Figure 9 is another view similar to Figure 6, but showing the stress-distributing means formed as a portion of a nut member of a coupling of the "compression ring" type.

Figure 10 is another view similar to Figure 6, but showing the stress-distributing means formed as a portion of a nut member of a coupling of the "soldered ring" type.

Figure 11 is another view similar to Figure 6, but showing the stress-distributing means formed as a part of a separate sleeve in a coupling of the "compression type."

Figure 12 is another view similar to Figure 6, but showing the stress-distributing means of the present invention formed integrally with the sleeve member of a coupling of the "flared tube" type.

Figure 13 is another view similar to Figure 6, but showing the stress-distributing means of the present invention formed integrally with the separable sleeve of a coupling of the "soldered ring" type.

By referring first to Figures 1 and 2, the particulars of the flexible, stress-distributing means bridging the juncture of a coupling and the tubing to which it is attached will first be described, after which the manner of application of the stress-distributing means to different types of conventional coupling constructions will be illustrated by several examples.

The resilient, stress-distributing means of the present invention is indicated in its entirety at 50, and comprises a body portion 51, which, as will be described more fully hereinafter, preferably constitutes a portion of the coupling with which the stress-distributing means is to cooperate. Consequently, it is preferred that the distributing means be constructed of the same material as that of which the remainder of the coupling member by which it is carried is formed, the principal requirement as far as selection of the material is concerned, being that it possesses a material degree of inherent resilience, inasmuch as this is a feature contributing to the theory of operation of my invention. In most cases, therefore, the material of which the device is constructed will probably most frequently be brass, inasmuch as that is the material commonly employed for the construction of couplings of the type here under discussion, and this metal is altogether satisfactory for the purposes of the present invention, having an ample degree of resilience to meet the requirements to be described hereinbelow.

There is a bore 52 completely through the resilient means 50. From the body part 51 there extends a portion 55 having two tapers, one on the outside 53 and the other on the inside 54 in the bore 52. The outside taper 53 graduates the outside diameter of the tapered portion 55 from some maximum value near the body part 51 to some minimum value near the outer end of the tapered portion 55 at point 56.

The inside taper 54 gradualy diminishes the inside diameter of bore 52 from some maximum value at point 57 adjacent the body 50 on said bore to some minimum value away from body part 51 at point 58 adjacent the outer end of the tapered portion 55. The tapered portion 55 is cut by a plurality of longitudinal, radial slots 59 which extend from the extreme outer end of the tapered portion 55 for a material distance toward the body part 51. The slots 59 may extend either to or beyond the inward end of the outside taper 53 into the body part 51. The slots 59 preferably extend beyond the inward end 57 of the inside taper 54 in the bore 52 for a material distance into the untapered part of the bore 52 inward of point 57 on said bore and into the body part 51.

Between the slots 59 the split parts of the tapered portion 55 form flexible extensions 64 which are integral with and extend from the body part 51. Thus the principal parts of the resilient means 50 are the body part 51 and the flexible extensions 64 having the outwardly convergent bore 52 therethrough. The base 65 of slots 59 is often referred to as the root of flexible extensions 64. The natural resiliency of the material of which the device is formed allows the flexible extensions 64 a certain amount of elastic radial flexure. The exact number of slots is determined by the desired degree of flexibility of the flexible extensions 64 consonant with the thickness of the tapered portion 55 as determined by internal taper 54 and external taper 53. It is apparent, therefore, that by selecting the proper number of slots 59 for a stress-distributor of given thickness wall, a nice balance may be assured for the several factors which contribute to the operation of the device.

A circumferential lip 66 extends uniformly around the outer ends of flexible extensions 64 and is cut by slots 59. The bore 52 extending through the lip 66 is reamed out to present a tapered throat 67 at the extreme outer end of the extensions 64. The maximum outside diameter of the tapered throat 67 is slightly greater than the maximum inside diameter of the bore 52 inwardly from point 57 on said bore so as to facilitate assembling the device upon the end of tubing 68 with which it is intended to cooperate. The tube 68 having an outside diameter a little less than the maximum inside diameter of bore 52 can be placed in the tapered throat 67 in axial alignment with the resilient means 50. Forcing the tube 68 against the tapered face of the throat 67 causes the flexible extensions 64 to be flexed radially outward due to their inherent elasticity thereby allowing the tube 68 to enter into bore 52. The elasticity of the inherently resilient flexible extensions 64 causes them to maintain close circumferential engagement with the enclosed tube 68.

The external taper 53 and the internal taper 54 of the flexible extension 64 are so designed in view of the particular material used that trusion of the tube 68 into the bore 52 causes the flexible extensions to flex gradually over their entire length, i. e., not only at some one point. In Figure 2 is shown the relative position of the flexible extensions 64 and the tube 68 when the tube has been forced into the bore 52. The internally tapered portion 54 between points 57 and 58 in the bore should contact tube 68 for substantially the entire length 69 of the bore 52 between the two said points. Optimum results are obtained for tube support if this is so, but excellent results are obtained if it is even partially so supported. The allowable variation of plus or minus 0.002 inch in outside diameter of standard market grades of tube 68 makes uniform contact only approximate. For greatest support good accuracy must be maintained for tube outside diameter and concentricity as related to bore 52. However, excellent results have been obtained with relatively loose fits.

The internal taper 54 between points 57 and 58 in the bore 52 is not necessarily straight but is usually increasingly convergent from point 57 to point 58. The exact nature of this longitudinal curve between 57 and 58 is determined by several factors, among them the resiliency of the material used, the longitudinal shape of exterior taper 53, the desired degree of flexibility, etc.

Due to the circumferential curvature of flexible extensions 64 they are stiffer to radial flexure than they would be if they were flat. However, if flat they make only tangential contact with the enclosed tube and thus do not offer circumferential support. Such types also cannot be made as easily on a lathe. This circumferential curvature further influences the longitudinal curvature of internal taper 54 between points 57 and 58. The greater the circumferential angle of a given flexible extension the stiffer it becomes. For example, in a brass coupling unit having a ⅜ inch ductile copper tube having three slots in the resilient means for one type of brass the maximum inside diameter at point 57 was approximately 0.380 inch or 0.005 inch over-size, and the minimum inside diameter at point 58 was approximately 0.360 inch or 0.020 inch under size (or about 0.010 inch on a side). The longitudinal curvature in this case is very slight. In a four slotted stress-distributor, the curvature might be greater for the same type of brass. However, with different materials and different tube sizes different values must be used. In all cases the number of slots determines the angular curvature of both longitudinal and circumferential curves of the flexible extension. The greater the number of slots, the nearer an individual flexible extension approaches flatness, and for a given external taper, the greater must be the internal longitudinal curve between points 57 and 58 to afford the same support.

The shape of the longitudinal curve 54 between points 57 and 58 on bore 52 is also determined by the desired degree of support of the enclosed tube against flexure. It has been thoroughly verified by experiment that to attain the longest life in a fluid conductor, the graduation of the stiffness along the conductor from the high value in the coupling down to the lesser value in the tubing should be as nearly uniform as possible, and such graduation should be spread out over as long a section of the less stiff member as is practical. Excessively long flexible extensions do not support the tube clear out to the tips of the extensions. A method of elastically connecting the ends of the flexible extensions with a circular spring around the outer ends of the extensions inward of the lip has been used with some success. Very short flexible extensions cannot be made flexible enough without using too little metal to be practical. Each type of material seems to have a different set of optimum values which differ with different bore diameters.

The circumferential contour of the contracted portion of bore 52 defined by the flexible fingers 64 is quite important. Mere point or line engagement of the flexible extension 64 with the tubing 68 has been found not to be satisfactory. The contact between the extensions and the tubing should be surface-to-surface throughout the transverse width of the extensions so as to provide support for the tubing substantially throughout its entire circumference. It is not the intent of the invention to secure a biting engagement between the extensions and the tubing, but merely a pressure contact through the resiliency of the extensions. Through such arrangement the tubing can be freely forced through the extensions into the connector and withdrawn therefrom without scarring or other mutilation, and because of the smooth surface fit the tubing and extensions may flex laterally without substantial increase in stiffness of the tubing because of the extensions. Because there is in effect a bearing contact between the extensions and tubing no restriction is imposed upon relative longitudinal sliding movement between such parts incident to lateral flexing.

Because extensions 64 are contracted in their normal condition as shown in Figure 1 and require spreading when tube 68 is inserted, bore 52 should be specially shaped so as to conform to the contour of the tubing in the spread position of the extensions. While it might be assumed that the circumferential contour of the tapered throat portion 54 of bore 52 would be the same in both the contracted position of the fingers shown in Figure 1 and in the expanded position thereof when the tubing is inserted as in Figure 2, this is not the case. Not only the size but the contour of the throat is changed incident to spreading. If the throat is circular in contour in one position of the fingers it will be non-circular in the other position.

Assuming that the tubing, as ordinarily the case, is circular, the tapered portion 64 of bore 52 with a circular contour in the contracted position of the fingers 64 is undesirable because upon expansion of the size of the bore upon insertion of the tubing the shape of the bore would become non-circular. This is explained by the fact that the smaller the size of the bore the smaller the radius of curvature. The greater the size of a circle the larger its radius of curvature and the less abrupt its arc. Hence the contour of the inner surfaces of fingers 54 must be formed with the same radius of curvature as the tubing, which is to say that the bore collectively defined by the fingers must be determined by the radius of the bore in the expanded position of the fingers as shown in Figure 2.

In the explanatory view of Figure 5, the dotted inner circle C' represents the diameter of the smallest portion of the contracted bore at point 58 adjacent its outer end as seen in Figure 1. The larger full line circle $C_2$ represents the outside contour of tubing 68 which is engaged by the fingers in their expanded position as shown in Figure 2. $R_1$ represents the radius of curvature of the contracted bore portion, and $R_2$ represents the radius of curvature of the tubing. It will be observed that the contour of fingers 64' in Figure 5 conform to the arc of a circle having a radius of curvature $R_1$. With such an arrangement the bore defined by the fingers in their contracted position would be circular, but, as shown in Figure 5, the inner contour of the respective fingers presents too abrupt an arc when expanded to conform to the contour of the tubing with the result that merely the longitudinal edges of the fingers engage the tubing. It is the intent of the present invention to avoid such result by forming the contour of the fingers with the radius of curvature $R_2$ so that circumferentially the interior surfaces of the fingers will each present arcs conforming to portions of the circular contour of the tubing. It will be noted that in Figure 3 with the fingers in contracted position the bore defined by the fingers is of non-circular contour whereas when the fingers are expanded to receive the tube as in Figure 4 there is a full surface-to-surface contact between the fingers and the tubing throughout the circumferential extent of the respective fingers.

In forming the contracted bore defined by the fingers 64 it is desirable to expand the fingers from their normal contracted position as shown in Figure 1 to their tube-engaging position, and then to form the bore by a drill of uniform diameter throughout its length rather than with a tapered drill. If the body portion 51 provides a close fit with the tubing the same drill may be employed to form the bore 52 throughout its entire length. If, however, the portion of the bore in body portion 51 is somewhat oversize with respect to the size of tubing 68 so as to provide only a loose fit, it is desirable to utilize a drill of smaller size than such portion of the bore in forming the bore portion through the normally convergent fingers 64, it being desirable that the arc of curvature of the inner faces of the fingers be the same as, or substantially so, the contour of the tubing. It will be apparent, of course, that just as too small a radius of curvature will result in line contact of the edges of the fingers with the tubing, too large a radius of curvature for the contour of the fingers will cause the fingers to engage the tubing merely with line contact at some point of their circumferential extent intermediate their edges.

Flexure or bending of the tube against the flexible extensions causes these extensions to "give" slightly. This elastic yielding of the resilient means is proportional to the degree of flexure within the limits of the material forming the resilient means. As in a spring leaf, the tips of the flexible extensions make a slidable contact with the enclosed tube. This slip between the flexible extensions and the enclosed tube makes for springy action not present if the flexible extensions are in any way soldered or otherwise rigidly attached to the enclosed tube. They carry the same yieldable support found in an ordinary leaf spring which would also be relatively less useful if its leaves were soldered or welded together. Thus the flexible extensions add support to the tube graduated outwardly from the coupling without greatly adding to its initial stiffness. Because the circumferential contour of the bore defined by the fingers conforms to the tubing as above explained, a smooth surface-to-surface contact is obtained between the resilient fingers throughout their circumferential extent as well as throughout their length.

Due to the fact that the device is so constructed that before its engagement upon the tube 68 the bore 52 at the outer end of the flexible extensions 64 is slightly less than the outside diameter of the tube 68 which it is to receive, after the tube has been thrust into the bore the extensions exert pressure radially inwards against the outer circumferential wall of the tube. The gradual decrease in thickness of the metal constituting these extensions and the gradual increase in the rate at which the diameter of the bore 52 decreases as the distance from the body 51 increases preferably are so proportioned with respect to each other, as well as with respect to the particular material employed and the number of slots 59 that the pressure exerted by the fingers, or extensions 64, is substantially evenly distributed over the entire length of the tube with which the fingers make contact. Moreover, due to the yielding nature of the pressure exerted by the fingers 64, this substantially even distribution of pressure is maintained, even after flexure of the tube has occurred to an extent which causes displacement of one or more of the fingers from the positions thereof indicated in Figure 2. Therefore, whether the portion of the tube 68 embraced by the fingers 64 remains straight or is bent after its insertion into the device, the fingers 64 continue to give yielding support to the tube, which support is substantially evenly distributed throughout the entire length of the fingers.

It is this evenly distributed support for a material length of the ductile tubing immediately adjacent the relatively stiff coupling structure that avoids the concentration of stress within the structure of the tubing which, when more conventional coupling devices have been employed, results so quickly in the fracture of the tubing. By providing support for the tubing which diminishes gradually as the distance from the coupling increases, I have caused whatever curvature may be imposed upon this portion of the tubing to be developed about a greater radius of curvature than would be the case were the resilient support herein described not provided, with a consequent elongation of the portion of the tubing wherein the curvature occurs. This, of course, reduces the amount of curvature occurring at any unit portion of the tubing, with the result that no portion of the tubing has as much stress imposed thereupon, although the total amount of curvature is not reduced. The same is true with respect to vibration to which the tubing is subjected.

Whether stress imposed upon the tubing and of such a nature that it tends to cause fracture of the tubing, is the result of flexure or of sustained vibration, or of a combination of these two actions, the stress-distributing means of the present invention prevents concentration of that stress within such a short length of the tubing that serious strain and fracture thereof would quickly result—instead, my device causes the stress to be distributed over a relatively great length of the tubing, with a consequent reduction in the amount of such stress imposed upon any unit portion of the tubing. It is apparent, therefore, how the device of the present invention serves to prolong the useful life of ductile tubing with which it is associated.

One of the important features of the present invention is that it is applicable to any of the numerous types of coupling for ductile tubing commonly employed. However, in any case, and without regard to which type of coupling is employed, the stress-distributing means 50 incorporated therewith in accordance with the principles of the present invention comprises the flexible extensions or fingers 64 hereinabove described, carried by a body portion 51 and having a convergently tapered bore 52 therethrough. The several individual couplings illustrated are merely exemplary, inasmuch as it has not been attempted to illustrate every possible type of coupling with which the device of the present invention can be incorporated advantageously, but merely to illustrate the manner of its incorporation with a few of the better known types of ductile tubing couplings.

In Figures 6 to 10, inclusive, the several types of tubing couplings illustrated all embody the resilient stress-distributing means 50 of my invention as an integral part of a one-piece clamping member which serves as the means for attaching the tubing to the base part of the coupling.

Describing these various forms of couplings in greater detail, Figure 6 illustrates a coupling of the type known in the trade as the "inverted nut" type, wherein the body portion 51 of my stress distributing means is formed integrally with the clamping ferrule 70, the resilient extensions or fingers 64 extending from the outer end of the ferrule. The other end of the ferrule 70 is provided with threads 71 engageable with interior threads of the base part 72 of the coupling. The bore 73 of the ferrule is adapted to receive the end of the tubing 74 therein; and the inner end of the bore 73 is flared, permitting a similarly flared portion 75 on the extreme end of the tubing to be engaged between the ferrule and a complementarily formed conical projection 76 on the base part 72 when the ferrule is tightened into the base part. In this manner, the end of the tubing is rigidly attached to the coupling base part 72 with its bore in registry and communication with bore 77 of the base part. It will be understood that the outer end (not shown) of the base part 72 will be threaded, as conventionally, for attachment of the assembled coupling and tubing to whatever structure with which it may be desired to have the tube 74 communicate.

It is apparent that when the tubing has been introduced through the resilient fingers 64 spreading the fingers to expand the contracted bore to the size of the tubing, and into the clamping ferrule 70, and the ferrule has been secured in the base part 72, the fingers 64 extending from the ferrule resiliently support said tubing through smooth surface-to-surface contact of inner faces of the fingers throughout their circumferential width and length with the periphery of the tubing against lateral flexure in the coupling and against sharp bending stresses either at the point of connection of the tubing and base part 72 or at the point of entry of the tubing into the outer end of the ferrule 70. The flexible extensions 64 in all cases bridge the juncture of tubing 74 and the coupling and regulate the radius of bending of the tubing transversely to its axis at and near the point of contact of the tubing with the coupling.

Point 83 at the base of the flared position 75 of tube 74 is the place where stress concentrations have been found to be greatest in common forms of couplings, but through the addition of the auxiliary structure provided under the invention this point is thoroughly protected from all stress concentration through the resilient support given the tubing by the flexible fingers 64 on the outer end of the coupling. Gradual flexure of the tubing is allowed by the fingers to an increasing degree in the direction of the outer ends of the fingers, serving to distribute all stress resulting from flexure and/or vibration over a material length of the tubing 74, instead of permitting such stress to be concentrated at point 83, so that danger of fracture of the tubing is mitigated.

Figure 7 shows an "inverted nut" type of coupling generally similar to Figure 6, but employing a modified means for attaching the tubing therein. Such means comprises a tapered deformable end 85 on the inner end of the ferrule 86 initially of the same internal diameter as the main portion of the ferrule but deformable inwardly against the tubing 87 to the position shown by engagement with the tapered seat formed by specially curved surface 89 in the coupling base part 88 when the ferrule is tightened therein. The curvature of seat 89 is such that the tapered end 85 is collapsed inwardly into such tight engagement with the tubing that the latter is rigidly and tightly attached to the coupling. As in the case of the coupling of Figure 6, the flexible and resilient fingers 64, being carried by ferrule 86 which is rigidly secured in base part 88, are enabled to afford the desired resilient support to the tubing enclosed thereby and distribute any stress resulting from flexure and/or vibration over sufficient length of tubing to mitigate danger of tube fracture.

Figures 8, 9 and 10 show the older types of "external nut" couplings. Figure 8 shows a standard flared tube type wherein the interior means in ferrule 90 for flaring and securing the tubing end is similar to that in the "internal nut" type of coupling of Figure 6; Figure 9 shows a standard compression type incorporating a deformable ring 92 which is collapsed inwardly upon the tubing when ferrule 91 is tightened; and Figure 10 shows a standard soldered tube type wherein a special ring 94 is soldered to the end of tubing 95 and compressed between ferrule 96 and coupling base part 97. In all of these cases the support for the tubing is embodied in resilient fingers 64 integral with a ferrule and functioning in the same manner as in connection with the inverted types of couplings previously described regardless of which of the three types of tube seal is used.

The principal difference between the embodiments of Figures 11, 12 and 13, and those of the embodiments previously described is that each of such subsequent embodiments, instead of employing a one-piece ferrule incorporating the auxiliary resilient stress-distributing means as an integral part thereof and serving the dual function of clamping the tubing to a coupling base part and also providing the resilient support for the tubing according to the principles of the invention, employ a two-part structure. Such two-part structure comprises a sleeve interiorly threaded for securing connection upon an associated coupling base part, and a compression ring cooperatively disposed inside the sleeve to be pressed into clamping engagement with the tubing and carrying the stress-distributing means.

The only difference between the forms of coupling illustrated in Figures 11, 12 and 13 lies in the manner of connection between the compression ring and the tubing. In Figure 11 the compression ring 101 is collapsed against the outer wall of tubing 102 when the threaded sleeve 103 is tightened, thus corresponding closely to the arrangement employed in the embodiment of Figure 7. In Figure 12 engagement of the coupling with the tubing 107 is obtained by clamping the flared end 106 of the tubing between a conical flared portion 108 at the inner end of compression ring 109 and a complementarily formed extension on the end of coupling base part 111 through tightening of sleeve 105. In the embodiment of Figure 13 the compression ring takes the form of an annulus 112 soldered or otherwise secured to the end of tubing 113 in the manner of Figure 10. Such ring 112 is clamped against the coupling base part 114 by the inner end of clamping ring 115 which embraces the tubing and which is engaged by a shoulder 116 on threaded sleeve 117 which may be tightened on the base part 114.

It will be observed that in each of Figures 11, 12 and 13 the resilient stress-distributing means, comprising resilient fingers 64 constructed and arranged as explained in connection with Figures 1 to 4, instead of being formed integrally with the coupling base-engaging threaded sleeve, is formed upon a separate ring which is disposed inside that element and which is adapted to be pressed into sealing engagement either with the tubing or with a ring soldered to the tubing when the threaded sleeve is tightened. However, the action of the stress-distributing means on the tubing is identical with that obtained in the coupling embodiments of Figures 6 to 10.

I claim:

1. In a connector for ductile tubing adapted to prevent concentration of stress at the point of connection, a body portion having a tubing-receiving bore, a plurality of extensions projecting lengthwise from one end of the body portion and cooperatively arranged to normally form a contracted throat concentric with the bore and of smaller size than the tubing, said extensions being resilient and adapted to be spread apart to expand the throat to the size of the tubing and resiliently engage the tubing when received in the bore of the body portion, the tubing-engaging inner faces of said resilient extensions conforming in their circumferential contour to the shape of the tubing so as to form an expanded throat fitting the tubing when the extensions are in their spread position and said inner faces defining a different contour as well as smaller size than the tubing in the contracted throat when the extensions are in their relaxed position.

2. In a connector for ductile tubing adapted to prevent concentration of stress at the point of connection, a body portion having a tubing-receiving bore, a plurality of circumferentially arranged, resilient fingers projecting lengthwise from one end of the body portion and cooperating to define a bore in extension of the bore in the body portion adapted to receive the tubing, but said fingers being convergent towards their outer ends whereby said extension bore is of gradually decreasing size in an outward direction to an extent requiring spreading of the fingers as the tubing is thrust into said bore, each of said resilient fingers being of gradually decreasing thickness in an outward direction whereby the lateral support offered said tubing by said fingers is of gradually diminishing intensity outwardly from the inner ends of the fingers, and the tube-engaging inner faces of the fingers throughout their length each having an arcuate circumferential contour adapted to form a circular bore fitting the circumferential contour of the tubing when the fingers are in their spread, tube-engaging position.

3. A tubing connector adapted to secure the end of a ductile tubing associated therewith without concentration of stress in the tubing such as may arise from flexure or vibration at the point of connection, said connector including a base coupling part, a sleeve threadedly engaged with said base part and adapted to receive the tubing end therein, and means actuated when the sleeve is tightened with respect to said base part for establishing a fluid-tight and rigid connection between the tubing end and the connector, and stress-distributing means adapted to bridge the juncture of the tubing and connector including a body portion supported by the sleeve and having a bore receiving the tubing, and a plurality of circumferentially arranged, resilient fingers projecting from the outer end of said body portion and pressed under their inherent resiliency into supporting engagement with the tubing, the inner faces of each of the fingers having an arcuate transverse curvature defined by the radius of curvature of the outer periphery of the tubing and making surface-to-surface contact circumferentially with the tubing.

ROBERT E. SNYDER.